US006487512B1

(12) United States Patent
Tursich

(10) Patent No.: US 6,487,512 B1
(45) Date of Patent: Nov. 26, 2002

(54) METHOD AND SYSTEM FOR SYNCHRONIZING A TIME OF DAY CLOCK BASED ON A SATELLITE SIGNAL

(75) Inventor: Stephen B. Tursich, Peyton, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 39 days.

(21) Appl. No.: 09/690,027

(22) Filed: Oct. 16, 2000

(51) Int. Cl.[7] .......................... G06F 19/00; G01C 21/00

(52) U.S. Cl. ...................... 702/89; 702/85; 342/357.06; 342/357.12; 342/358; 701/214

(58) Field of Search ........................ 702/85, 89, 94–95, 702/149; 342/352, 356, 357.01, 357.06, 357.08, 357.12, 358, 357.17; 701/207, 213–214, 300

(56) References Cited

U.S. PATENT DOCUMENTS 5,463,400 A * 10/1995 Tayloe ........................ 342/352
5,506,781 A * 4/1996 Cuinmiskey et al. ....... 701/226
5,663,734 A * 9/1997 Krasner ................. 342/357.12
5,945,944 A * 8/1999 Krasner ................. 342/357.06
6,133,874 A * 10/2000 Krasner ................. 342/357.15

* cited by examiner

*Primary Examiner*—Bryan Bui

(57) ABSTRACT

A method and a system to synchronize a time of day clock of a clock system. The method and system include a portable satellite timing system at a first location receiving a satellite signal comprising a first time of day signal. An internal clock of the portable satellite timing system is calibrated based on the first time of day signal to generate a second time of day signal. The portable satellite timing system is transported to a second location and coupled to the clock system. The second time of day signal is transferred from the portable satellite timing system to the clock system and the time of day clock is synchronized based on the second time of day signal. After a time period, the portable satellite timing system is transported to the first location.

15 Claims, 8 Drawing Sheets

METHOD AND SYSTEM FOR SYNCHRONIZING A TIME OF DAY CLOCK BASED ON A SATELLITE SIGNAL

BACKGROUND OF THE INVENTION

1. Field of the Invention

The invention relates to the field of clock systems, and in particular, to synchronizing a time of day clock.

2. Statement of the Problem

In some situations, it may be advantageous to have a clock system that is synchronized with a time standard such as Universal Time Coordinated (UTC). It may also be advantageous for two or more systems to have clock systems that are substantially synchronized. For instance, a clock system for a test apparatus may be synchronized with a clock system of a system under test. One method of synchronizing clock systems is by connecting to a Network Time Protocol (NTP) server. The Network Time Protocol (NTP) is used to synchronize the time of a computer client or server to another server or reference time source. NTP provides client accuracies typically within a millisecond on Local Area Networks (LANs) and up to a few tens of milliseconds on Wide Area Networks (WANS) relative to a primary server synchronized to the UTC. A problem with synchronizing a system with the NTP server is the system needs a connection to the NTP server such as a radio receiver, a satellite receiver, or a modem. The NTP server connection may be expensive and/or impractical to use.

Another method of synchronizing clock systems to a time standard is with a Global Positioning System (GPS). A GPS receiver receives a GPS satellite signal from satellites through a GPS antenna. The GPS satellite signal carries a highly accurate time of day signal on a stabilized frequency. The GPS satellite signal also carries a 1 Hz signal and a 10 MHz signal. The time of day signal, the 1 Hz signal, and the 10 MHz signal are synchronized to the UTC. When the GPS receiver is coupled to a clock system, the clock system synchronizes an internal time of day clock based on the time of day signal, the 1 Hz clock signal, and the 10 MHz clock signal. The 10 MHz signal is the reference frequency from which the time of day clock keeps time. The time of day clock is synchronized to the UTC as long as the GPS receiver provides the 10 MHz signal.

A problem arises when a clock system is in a location where the GPS satellite signal cannot be received on a reliable basis. For instance,the clock system is typically in a structure. In such a case, the GPS antenna is mounted on the outside of the structure where the GPS satellite signal can be received. The mounted GPS antenna requires a cable be run through the structure to the GPS receiver. A problem is that situations may arise where it is not possible or desirable to mount a GPS antenna on the structure, or desirable to run the cable through the structure.

SUMMARY OF THE SOLUTION

A method for synchronizing a time of day clock of a clock system solves the above problems. Advantageously, the method synchronizes the time of day clock that is located where a reliable satellite signal cannot be received. The time of day clock, when in a structure for instance, can be synchronized to the UTC without having to install an antenna on the outside of the structure or run a cable through the structure.

For this method, a portable satellite timing system is initially positioned at a first location where the portable satellite timing system receives a satellite signal. The satellite signal includes a first time of day signal. The portable satellite timing system calibrates its internal clock based on the first time of day signal. From the internal clock, portable satellite timing system generates a second time of day signal. The portable satellite timing system is then transported to a second location and coupled to the clock system. The satellite signal is not available on a reliable basis at the second location, so the portable satellite timing system maintains the second time of day signal while at the second location. The portable satellite timing system transfers the second time of day signal to the clock system. The clock system synchronizes its time of day clock based on the second time of day signal. The time of day clock operates within an accuracy threshold for a given period of time. At the end of the time period, the portable satellite timing system is transported back to the first location to receive the satellite signal and refresh the second time of day signal. The portable satellite timing system is then transported back to the second location. The portable satellite timing system transfers the refreshed second time of day signal to the clock system. The clock system re-synchronizes its time of day clock based on the refreshed second time of day signal.

In some embodiments, the satellite signal also includes a first pulse signal and a first clock signal. The portable satellite timing system calibrates its internal clock based on the first time of day signal, the first pulse signal, and the first clock signal. From its internal clock, portable satellite timing system generates the second time of day signal, a second pulse signal, and a second clock signal. The portable satellite timing system is transported to the second location and coupled to the clock system. The portable satellite timing system maintains the second time of day signal, the second pulse signal, and the second clock signal while at the second location. The portable satellite timing system transfers the second time of day signal, the second pulse signal, and the second clock signal to the clock system. The clock system synchronizes its time of day clock based on the second time of day signal, the second pulse signal and the second clock signal.

DETAILED DESCRIPTION OF THE INVENTION

Figure 1:
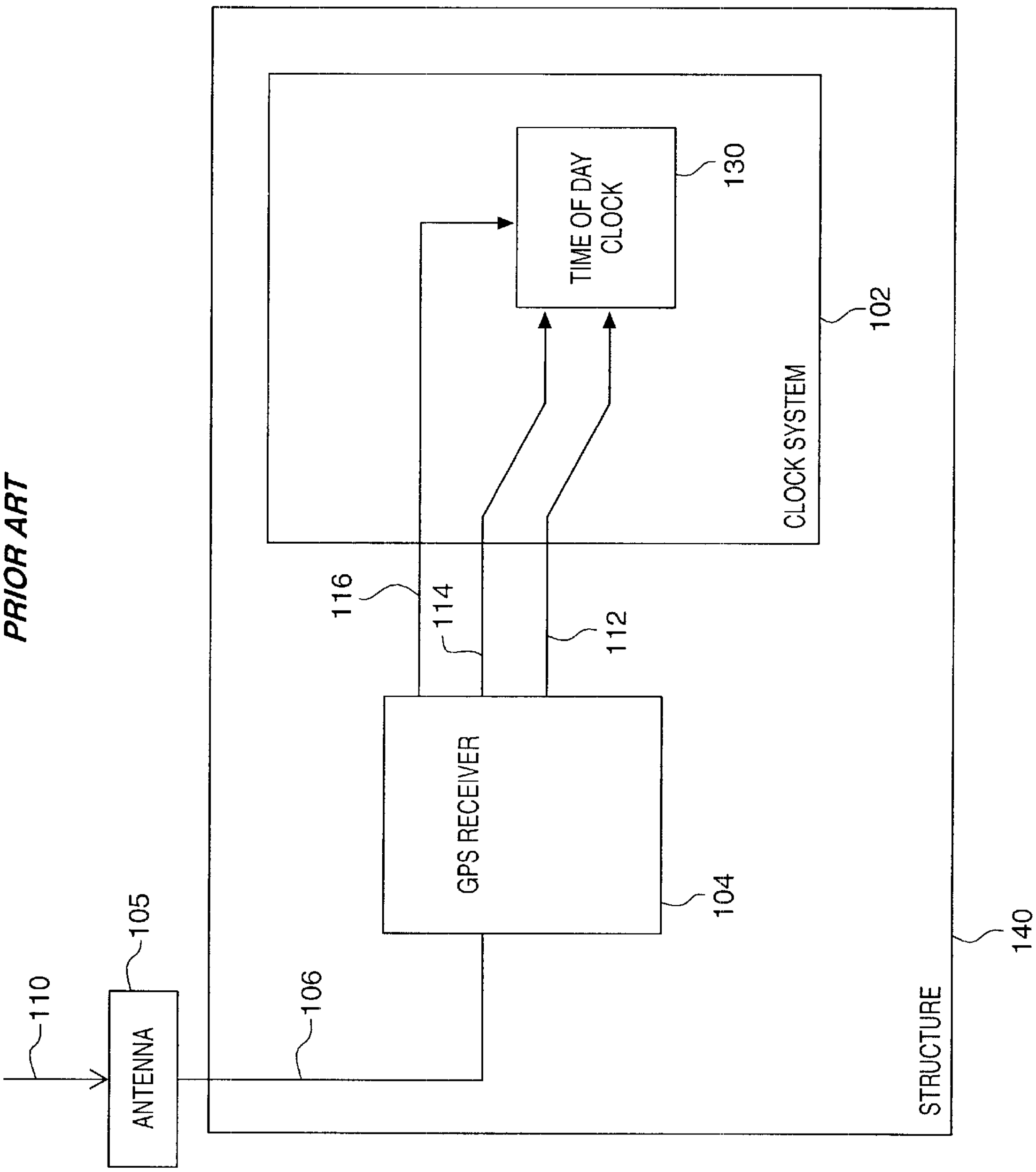
FIG. 1 PRIOR ART
FIG. 1 is a block diagram that depicts a system for synchronizing a time of day clock of a clock system in the prior art.
Figure 2:
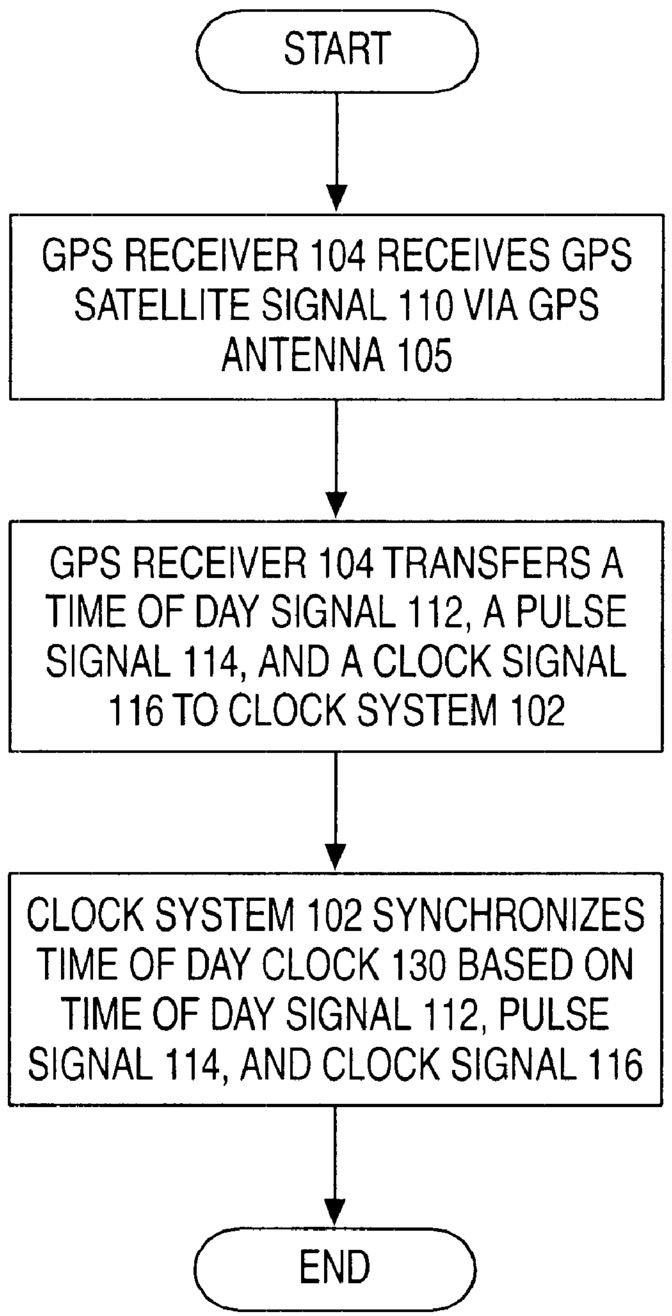
FIG. 2 PRIOR ART
FIG. 2 is a flow chart that depicts a method for synchronizing a time of day clock in the, prior art.

Prior Art Method for Synchronizing a Clock System—FIGS. 1–2

In order to more clearly understand the invention, FIGS. 1–2 show a system and method of synchronizing a time of day clock 130 of a clock system 102 in the prior art. FIG. 1 depicts a GPS receiver 104 coupled to clock system 102 and a GPS antenna 105. Clock system 102 is comprised of time of day clock 130. GPS receiver 104 and clock system 102 are located inside a structure 140 where a GPS satellite signal 110 cannot be received on a reliable basis. GPS antenna 105 is mounted on the outside of structure 140 and is configured to receive GPS satellite signal 110. GPS satellite signal 110 includes a time of day signal 112, a pulse signal 114, and a clock signal 116. Time of day signal 112 represents the current time of day, pulse signal 114 is a 1 Hz signal, and clock signal 116 is a 10 MHz signal. GPS antenna 105 is coupled to GPS receiver 104 by a cable 106 that runs through structure 140.

FIG. 2 depicts the method of synchronizing time of day clock 130. GPS receiver 104 receives GPS satellite signal 110 via GPS antenna 105. GPS receiver 104 transfers time of day signal 112, pulse signal 114, and clock signal 116 to clock system 102. Clock system 102 synchronizes time of day clock 130 based on time of day signal 112, pulse signal 114, and clock signal 116.

To synchronize time of day clock 130, clock system 102 initializes time of day clock 130 based on time of day signal 112 at a rising edge of pulse signal 114. After initializing time of day clock 130, clock system 102 increments time of day clock 130 based on clock signal 116 to keep track of time. Time of day clock 130 is now synchronized to the UTC because time of day signal 112, pulse signal 114, and clock signal 116 are synchronized to the UTC.

Figure 3:
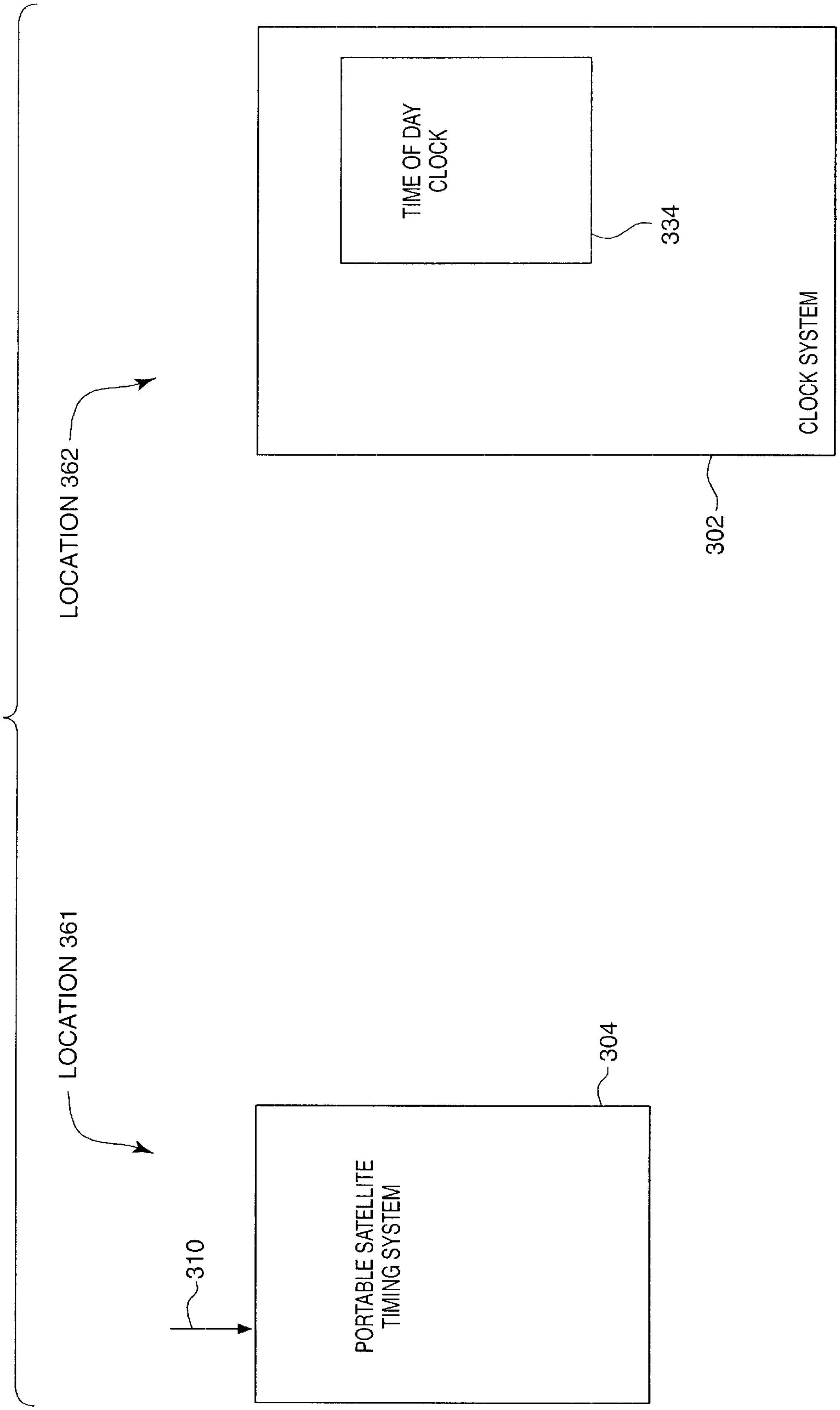
FIG. 3 is a block diagram that depicts a portable satellite timing system at a first location,-and de-coupled from a clock system in an example of the invention.
Figure 4:
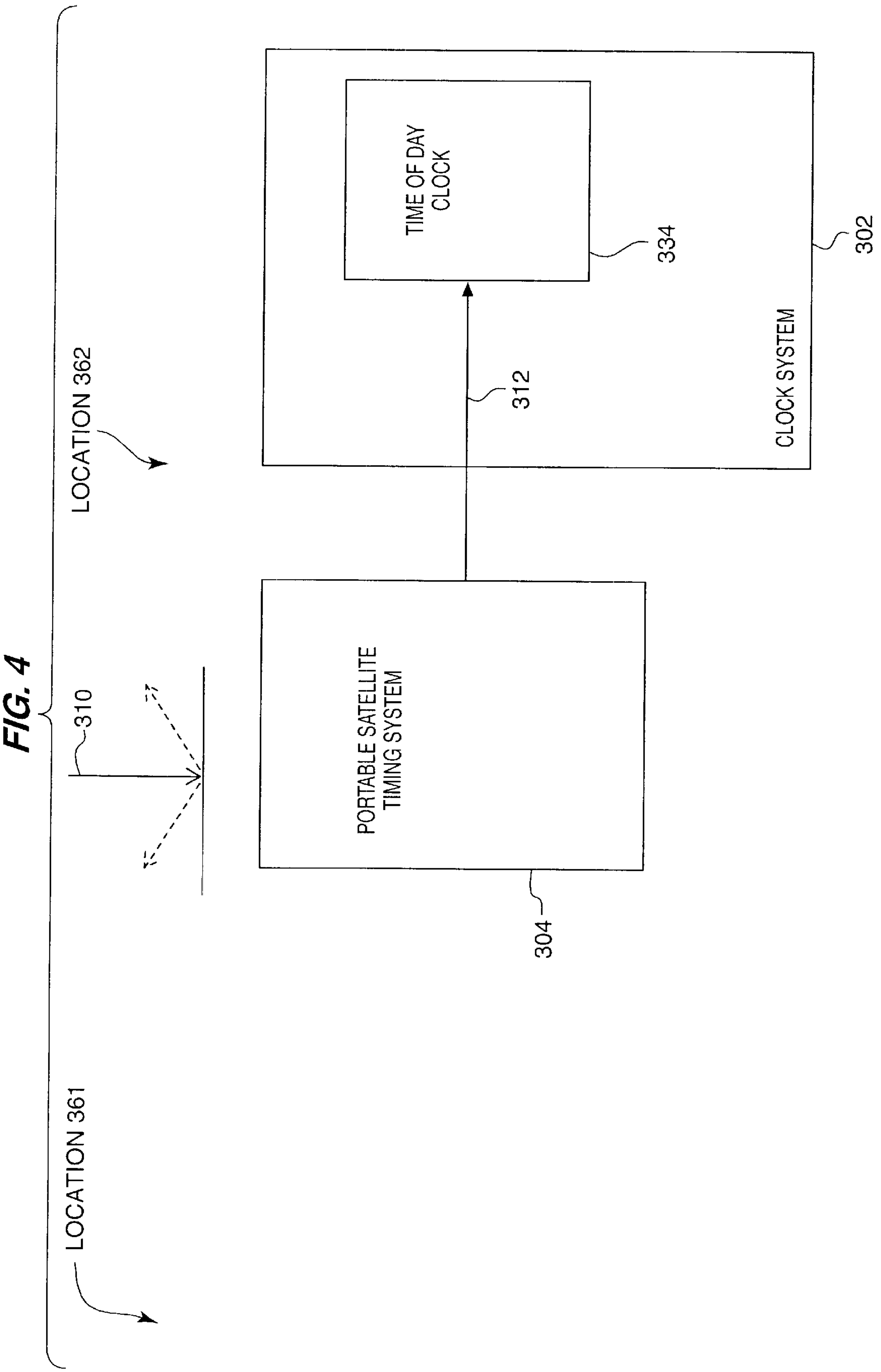
FIG. 4 is a block diagram that depicts a portable satellite timing system at a second location and coupled to a clock system in an example of the invention.
Figure 5:
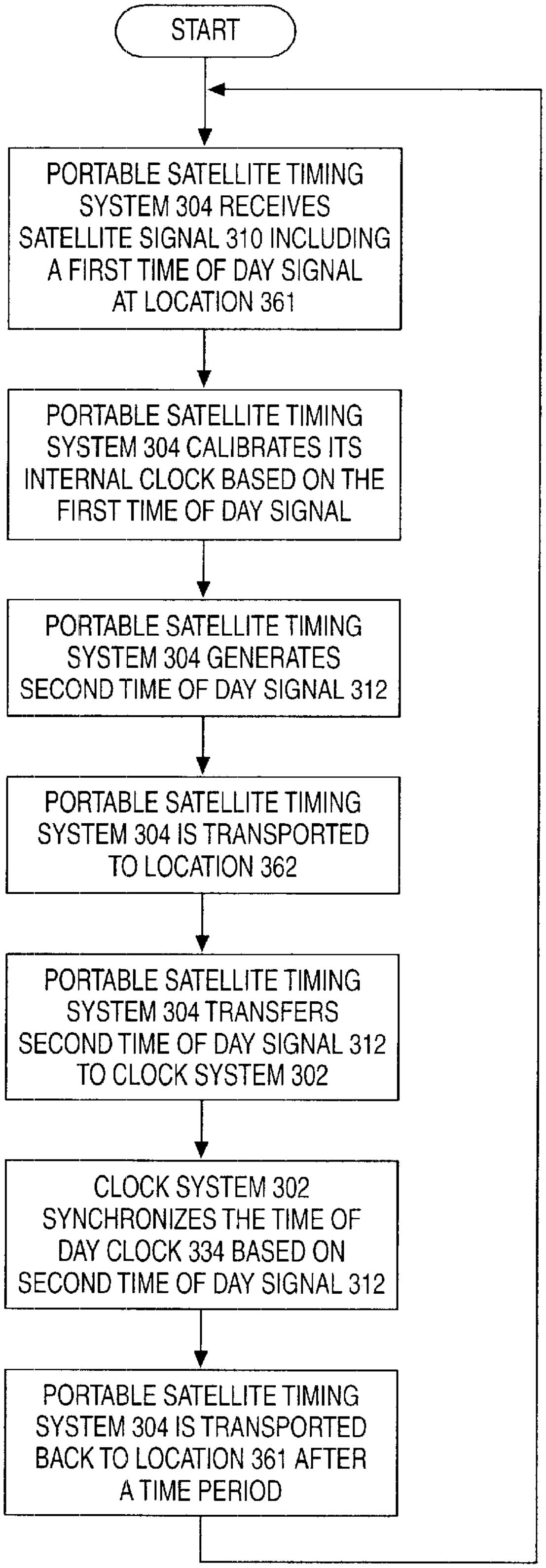
FIG. 5 is a flow chart that depicts a method of synchronizing a time of day clock of a clock system in an example of the invention.

First Method and System for Synchronizing a Time of Day Clock—FIGS. 3–5

FIGS. 3–5 depict a specific example of a method and system for synchronizing time of day clock 334 of a clock system 302 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3–5 have been simplified or omitted for clarity.

FIG. 3 depicts clock system 302 positioned at location 362 where satellite signal 310 cannot be received on a reliable basis. Portable satellite timing system 304 is positioned at location 361 and de-coupled from clock system 302. Clock system 302 is comprised of time of day clock 334. Portable satellite timing system 304 is configured to receive satellite signal 310, including a first time of day signal.

FIG. 4 depicts portable satellite timing system 304 re-positioned at location 362 and coupled to clock system 302. Portable satellite timing system 304 does not receive satellite signal 310 at location 362 on a reliable basis. Portable satellite timing system 304 is configured to generate second time of day signal 312 based on the first time of day signal and transfer second time of day signal 312 to clock system 302.

FIG. 5 depicts a method of synchronizing time of day clock 334. Portable satellite timing system 304 receives satellite signal 310 at location 361 as shown in FIG. 3. Portable satellite timing system 304 calibrates its internal clock based on the first time of day signal. Portable satellite timing system 304 generates second time of day signal 312 based on its internal clock. Portable satellite timing system 304 is then transported to location 362 and coupled to clock system 302 as shown in FIG. 4. Portable satellite timing system 304 transfers second time of day signal 312 to clock system 302. Clock system 302 synchronizes time of day clock 334 based on second time of day signal 312.

Time of day clock 334 operates within an accuracy threshold for a time period. After the time period, portable satellite timing system 304 is transported back to location 361 to receive satellite signal 310. The above method is repeated to keep time of day clock 334 synchronized.

Figure 6:
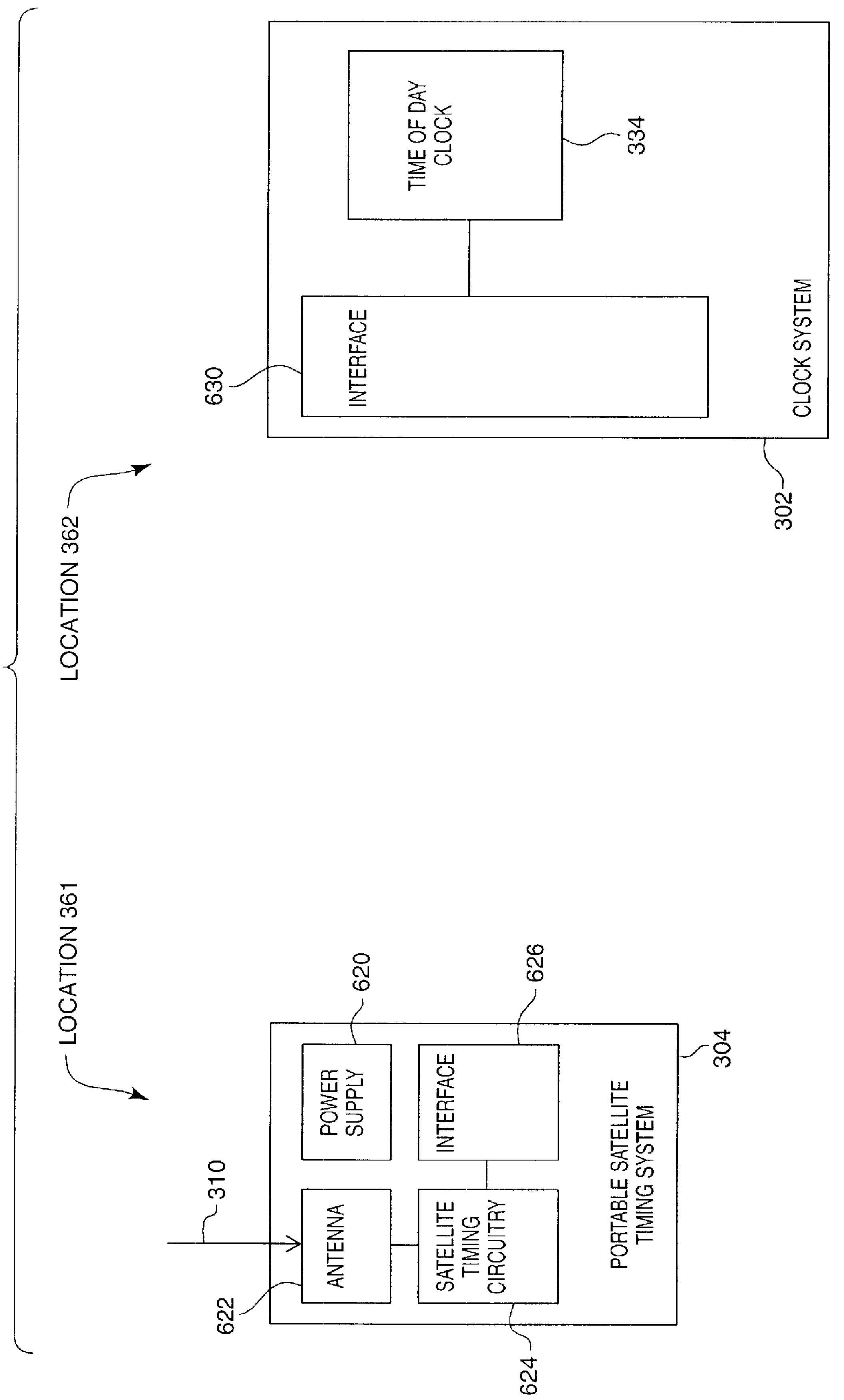
FIG. 6 is a block diagram that depicts a portable satellite timing system at a first location and de-coupled from a clock system in an example of the invention.
Figure 7:
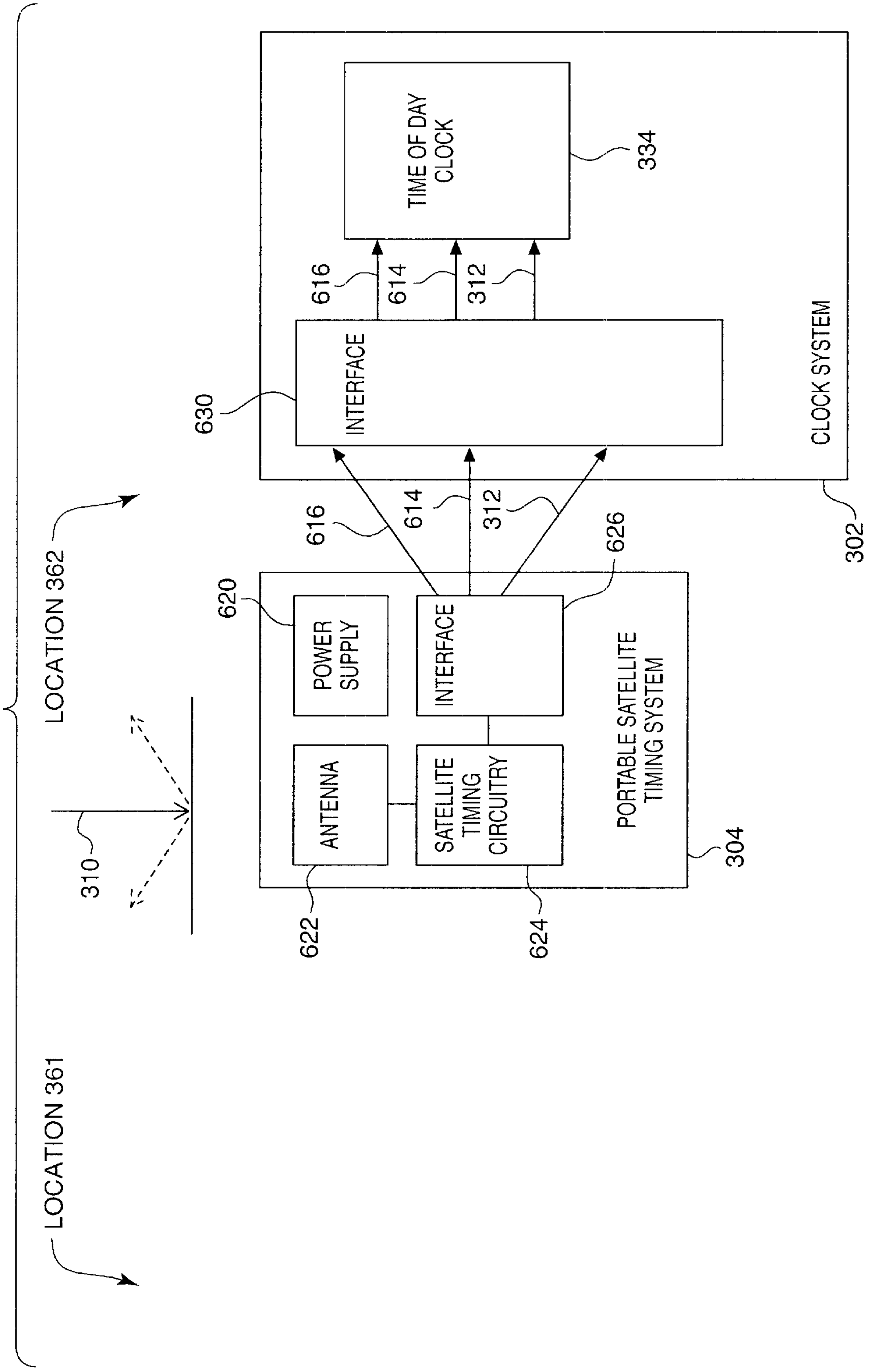
FIG. 7 is a block diagram that depicts a portable satellite timing system at a second location and coupled to a clock system in an example of the invention.
Figure 8:
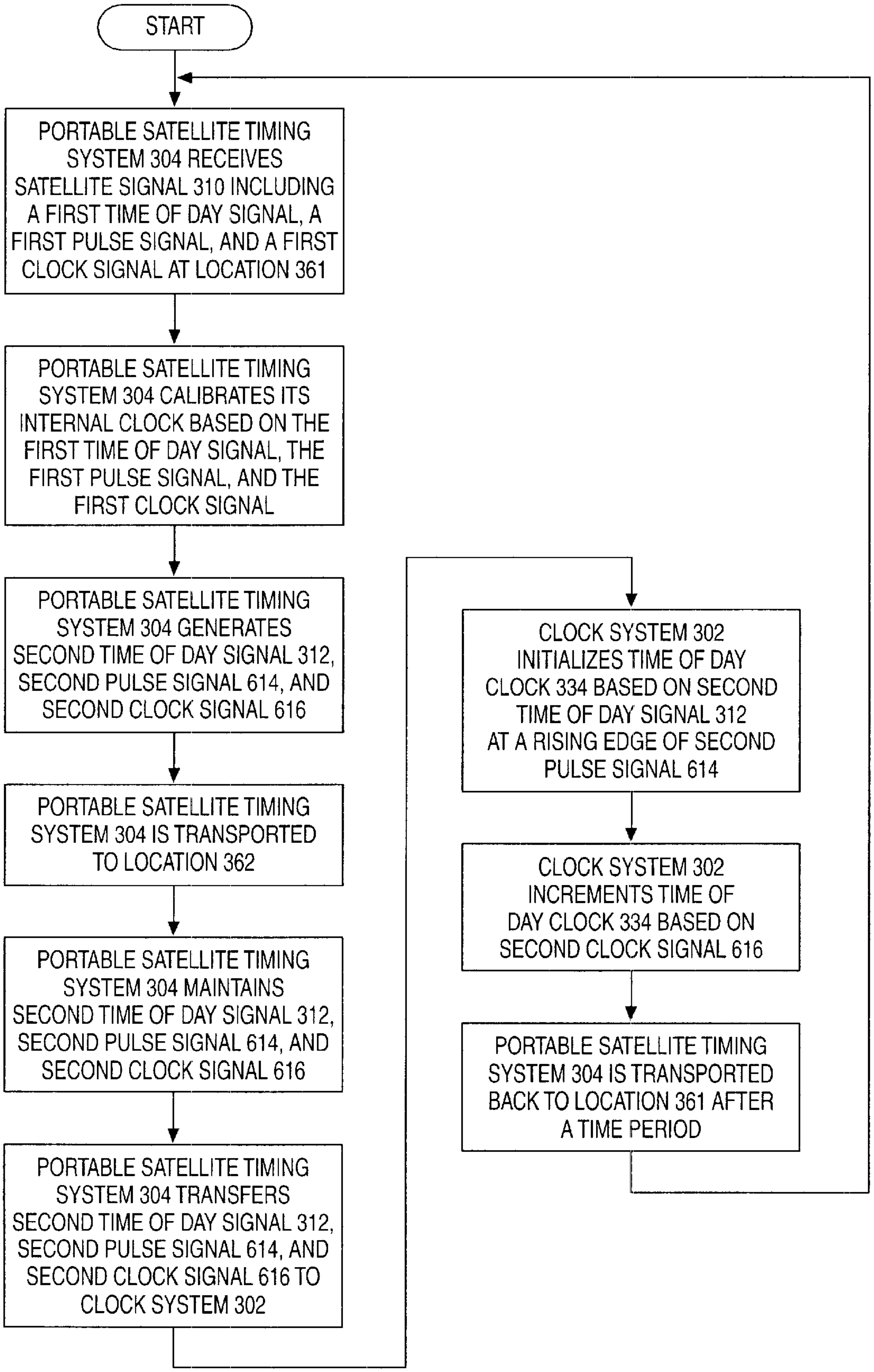
FIG. 8 is a flow chart that depicts a method of synchronizing a time of day clock of a clock system in an example of the invention.

Second Method and System for Synchronizing a Time of Day Clock—FIGS. 6–8

FIGS. 6–8 depict a specific example of a method and system for synchronizing time of day clock 334 of clock system 302 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 6–7 have been simplified or omitted for clarity.

FIG. 6 depicts clock system 302 positioned at location 362 where satellite signal 310 cannot be received on a reliable basis. Portable satellite timing system 304 is positioned at location 361 and de-coupled from clock system 302. Clock system 302 is comprised of time of day clock 334 and interface 630. Interface 630 is coupled to time of day clock 334. Portable satellite timing system 304 is comprised of antenna 622, power supply 620, satellite timing circuitry 624, and interface 626. Antenna 622 is coupled to satellite timing circuitry 624. Satellite timing circuitry 624 is coupled to interface 626. Portable satellite timing system 304 is configured to receive satellite signal 310. Satellite signal 310 includes a first time of day signal, a first pulse signal, and a first clock signal.

Portable satellite timing system 304 runs off of power from power supply 620. Power supply 620 could be a battery, a power line, an un-interruptable power supply, or some other power source. Portable satellite timing system 604 could be a portable Global Positioning System (GPS) or some other system that receives timing information from satellites.

FIG. 7 depicts portable satellite timing system 304 re-positioned at location 362 and coupled to clock system 302. Portable satellite timing system 304 does not receive satellite signal 310 at location 362 on a reliable basis. Satellite timing circuitry 624 is configured to generate second time of day signal 312, second pulse signal 614, and second clock signal 616 based on the first time of day signal, the first pulse signal, and the first clock signal, respectively. Interface 626 is configured to transfer second time of day signal 312, second pulse signal 614, and second clock signal 616 to interface 630. Second time of day signal 312 represents the current time of day. Second pulse signal 614 is a 1 Hz signal. Second clock signal 616 is a 10 MHz signal.

FIG. 8 depicts a method of synchronizing time of day clock 334. Antenna 622 receives satellite signal 310 when portable satellite timing system 304 is at location 361 as shown in FIG. 6. Antenna 622 transfers satellite signal 310 to satellite timing circuitry 624. Satellite timing circuitry 624 calibrates its internal clock based on the first time of day signal, the first pulse signal, and the first clock signal. Satellite timing circuitry 624 generates second time of day signal 312, second pulse signal 614, and second clock signal 616 based on its internal clock and transfers signals 312, 614, and 616 to interface 626. Portable satellite timing system 304 is then transported to location 362 and coupled to clock system 302 as shown in FIG. 7. Because portable satellite timing system 304 does not receive satellite signal 310 at location 362, portable satellite timing system 304 maintains second time of day signal 312, second pulse signal 614, and second clock signal 616.

When coupled to clock system 302, interface 626 transfers second time of day signal 312, second pulse signal 614, and second clock signal 616 to interface 630. Interface 630 transfers second time of day signal 312, second pulse signal 614, and second clock signal 616 to time of day clock 334. Clock system 302 synchronizes time of day clock 334 based on second time of day signal 312, second pulse signal 614, and second clock signal 616. To synchronize time of day clock 334, clock system 302 first initializes time of day clock 334 based on second time of day signal 312 at a rising edge of second pulse signal 614. After initializing time of day clock 334, clock system 302 increments time of day clock 334 based on second clock signal 616 to keep track of time. In some embodiments, clock system 302 adjusts clock signal 616 to 10 MHz using a conventional Phase-Locked Loop (PLL). Time of day clock 334 is now synchronized to Universal Time Coordinated (UTC) because second time of day signal 312, second pulse signal 614, and second clock signal 616 are synchronized to the UTC.

Because portable satellite timing system 304 does not receive satellite signal 310 while coupled to clock system 302 at location 362, second clock signal 616 drifts overtime. With second clock signal 616 being the reference frequency for time of day clock 334, time of day clock 334 also drifts over time. Time of day clock 334 operates within an accuracy threshold for a period of time. To determine the accuracy threshold for instance, portable satellite timing system 304 may provide an amount of drift for that particular system 304 in a specification as a function of time. Therefore, the accuracy of time of day clock 334 can be calculated as a function of time. The time measurement is the time since portable satellite timing system 304 received satellite signal 310 at location 361. If desired, clock system 302 indicates when the accuracy of time of day clock 334 drifts beyond the threshold such as through a warning light or an alarm.

After the time period expires, portable satellite timing system 304 is de-coupled from clock system 302. Portable satellite timing system 304 is transported back to location 361. Portable satellite timing system 304 again receives the satellite signal 310 and refreshes its internal clock. Portable satellite timing system 304 is again transported to location 362 and coupled to clock system 302. Portable satellite timing system 304 transfers the refreshed second time of day signal 312, second pulse signal 614, and second clock signal 616 to clock system 302. Clock system 302 re-synchronizes time of day clock 334 based on the refreshed second time of day signal 312, second pulse signal 614, and second clock signal 616. The process of transporting portable satellite timing system 304 to location 361, refreshing the internal clock of portable satellite timing system 304, transporting portable satellite timing system 304 to location 362, and transferring refreshed signals 312, 614, and 616 to clock system 302 is continually repeated to synchronize time of day clock 334.

Those skilled in the art will appreciate variations of the above-described methods that fall within the scope of the invention. As a result, the invention is not limited to the specific examples and illustrations discussed above, but only by the following claims and their equivalents.

What is claimed is:

1. A method of synchronizing a time of day clock of a clock system, the method comprising:

receiving a satellite signal comprising a first time of day signal by a portable satellite timing system at a first location;

calibrating an internal clock of the portable satellite timing system based on the first time of day signal to generate a second time of day signal;

transporting the portable satellite timing system to a second location;

coupling the portable satellite timing system to the clock system;

transferring the second time of day signal from the portable satellite timing system to the clock system;

synchronizing the time of day clock based on the second time of day signal; and transporting the portable satellite timing system to the first location after a time period.

2. The method as recited in claim 1, wherein the portable satellite timing system does not receive the satellite signal at the second location.

3. The method as recited in claim 1, further comprising:

maintaining the second time of day signal when portable satellite timing system is at the second location.

4. The method as recited in claim 1, further comprising:

receiving the satellite signal including a first clock signal with the portable satellite timing system at the first location and calibrating the portable satellite timing system based on the first clock signal to generate a second clock signal.

5. The method as recited in claim 4, further comprising:

transferring the second clock signal from the portable satellite timing system to the clock system and synchronizing the time of day clock based on the second clock signal.

6. The method as recited in claim 5, wherein the time period is based on an accuracy of an overtime of the second clock signal.

7. The method as recited in claim 5, wherein the second clock signal is about 10 MHz.

8. The method as recited in claim 1, further comprising:

receiving the satellite signal comprising a first pulse signal by a portable satellite timing system at the first location and calibrating an internal clock of the portable satellite timing system based on the first pulse signal to generate a second pulse signal.

9. The method as recited in claim 8, further comprising:

transferring the second pulse signal from the portable satellite timing system to the clock system and synchronizing the time of day clock based on the second pulse signal.

10. The method as recited in claim 9, wherein the second pulse signal is about 1 Hz.

11. The method as recited in claim 1, further comprising:

receiving the satellite signal comprising a first pulse signal and a first clock signal by the portable satellite timing system at the first location;

calibrating the internal clock of the portable satellite timing system based on the first pulse signal and the first clock signal to generate a second pulse signal and a second clock signal, respectively;

transferring the second pulse signal and the second clock signal from the portable satellite timing system to the clock system;

initializing the time of day clock based on the second time of day signal at an edge of the second pulse signal; and incrementing the time of day clock based on the second clock signal.

12. The method as recited in claim 1, wherein the portable satellite timing system comprises a portable Global Positioning System.

13. The method as recited in claim 1, wherein the portable satellite timing system has battery power.

14. The method as recited in claim 1, wherein the portable satellite timing system has a satellite antenna.

15. The method as recited in claim 1, wherein the synchronizing of the time of day clock further comprises synchronizing the time of day clock to Universal Time Coordinated.

* * * * *